(12) United States Patent
Chen

(10) Patent No.: US 7,562,978 B2
(45) Date of Patent: Jul. 21, 2009

(54) ELASTIC BAND FOR USE WITH EYEGLASSES

(76) Inventor: Chin-Jen Chen, No. 39-7, Liu Kuai Liao, Liu Chia Village, An Ting Hsiang, Tainan Hsien (TW)

( * ) Notice: Subject to any disclaimer, the term of this patent is extended or adjusted under 35 U.S.C. 154(b) by 0 days.

(21) Appl. No.: 11/892,322

(22) Filed: Aug. 22, 2007

(65) Prior Publication Data

US 2009/0051869 A1 Feb. 26, 2009

(51) Int. Cl.
*G02C 3/00* (2006.01)

(52) U.S. Cl. ....................... 351/156; 351/157

(58) Field of Classification Search ............ 351/156, 351/157; 2/452
See application file for complete search history.

(56) References Cited

U.S. PATENT DOCUMENTS 4,974,956 A * 12/1990 Gill ............................ 351/156
5,074,656 A * 12/1991 Parrish ........................ 351/156

* cited by examiner

*Primary Examiner*—Huy K Mai
(74) *Attorney, Agent, or Firm*—Rosenberg, Klein & Lee

(57) ABSTRACT

An elastic band includes a fastening band, and a protective member; the fastening band is elastic, and includes a band body, and two connecting sleeve parts, which are joined to two ends of the band body, and intended for connection with temples of a pair of eyeglasses; the protective member is made of soft and water-absorbent material, and it covers the band body of the fastening band to reduce the wearer's discomfort caused by the fastening band; in use, the fastening band and the eyeglasses together are positioned around the wearer's head with a proper tightness such that the eyeglasses are firm without possibility of falling off accidentally even if the wearer is moving drastically; the protective member can be separated from the fastening band to be washed and replaced with a new one after it takes in much perspiration or becomes dirty.

3 Claims, 3 Drawing Sheets

ELASTIC BAND FOR USE WITH EYEGLASSES

BACKGROUND OF THE INVENTION

1. Field of the Invention

The present invention relates to an elastic band for use with eyeglasses, more particularly one, which includes an elastic fastening band to make eyeglasses firm on the wearer's head, and a soft and water-absorbent protective member covering the elastic band to absorb the wearer's perspiration, and reduce discomfort caused by the tense elastic band; the protective member can be separated from the elastic band to be washed/replaced.

2. Brief Description of the Prior Art

Common eyeglasses for assisting the sight, e.g. those for near-sightedness and far-sightedness, include a front, and two temples, which are connected to the front, and have at rear ends thereof earpieces to be propped on and hooked over the wearer's ears for holding the eyeglasses in place. Such eyeglasses are prone to move away from the proper position and even fall off to get damaged when the wearer is playing ball games or participating in athletic contests.

To overcome the above problem, an ear-propped device is provided for use with eyeglasses, which includes a pair of ear-propped parts. In use, the ear-propped parts are joined to rear ends of temples of a pair of eyeglasses respectively; thus, when a person wears the eyeglasses, the ear-propped parts will be hooked over rear portions of the wearer's ears so as to make the eyeglasses firm.

However, such an ear-propped device can't prevent eyeglasses from falling off when the wearer is doing drastic exercises.

Therefore, the inventor of the preset invention invented a kind of ear-propped device with an elastic band, and filed a patent application based on the above device on Jun. 12, 2007, whose application Ser. No. is 11/808,577. The ear-propped device includes two ear-propped parts, and an elastic band; each ear-propped part includes a connecting portion to be joined to a corresponding eyeglasses temple, and a hooking portion to be hooked over the wearer's ears. The ear-propped parts are formed on two ends of the elastic band. In use, the ear-propped parts are joined to rear ends of temples of a pair of eyeglasses, with the hooking portions thereof being hooked over hinder portions of the ears of the wearer of the eyeglasses, such that the eyeglasses and the elastic band together are tight around the wearer's head. Consequently, the eyeglasses are firm, and can't change position or fall off accidentally.

However, because the elastic band is made of high-density airtight and watertight materials, it can't absorb the wearer's perspiration or help perspiration to flow through, and the wearer will feel very hot and uncomfortable when he/she is doing exercises to perspire a lot. Furthermore, the elastic band will cause discomfort to the wearer because it is tense, and presses the rear portion of the wearer's head.

SUMMARY OF THE INVENTION

It is a main object of the present invention to provide an elastic band for use with eyeglasses to overcome the above problems.

An elastic band according to an embodiment of the present invention includes a fastening band, and a protective member. The fastening band is elastic, and includes two connecting sleeve parts for connection with eyeglasses temples. The protective member is made of soft and water-absorbent material, and it covers the fastening band to reduce the wearer's discomfort caused by the fastening band. In use, the fastening band and the eyeglasses together are positioned around the wearer's head with a proper tightness such that the eyeglasses are firm without possibility of falling off accidentally when the wearer is moving drastically; the protective member can be separated from the fastening band to be washed and replaced with a new one.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
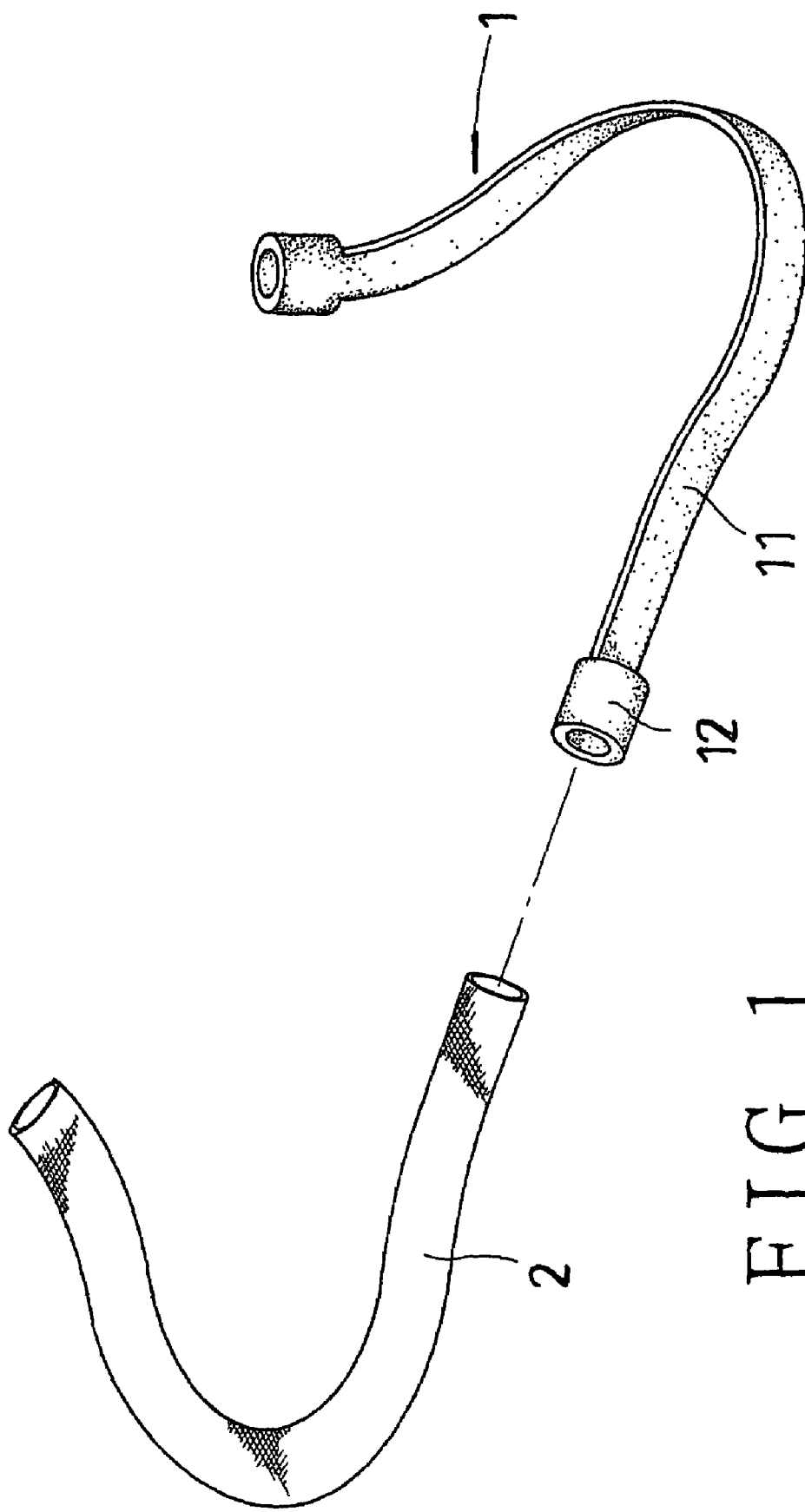
FIG. 1 is an exploded perspective view of the present invention.

Referring to FIG. 1, a preferred embodiment of an elastic band of the present invention includes a fastening band 1, and a protective member 2.

The fastening band 1 is elastic. The fastening band 1 includes a band main body 11, and two connecting sleeve parts 12, which are joined to two ends of the band main body 11 respectively, and which are intended for connection with temples of a pair of eyeglasses. The fastening band 1 is elastic because it is made of high-density airtight and watertight materials.

The protective member 2 covers the band main body 11 of the fastening band 1 so that the connecting sleeve parts 12 are outside the protective member 2. The protective member 2 is made of soft and water-absorbent materials, e.g. cotton cloth.

Figure 2:
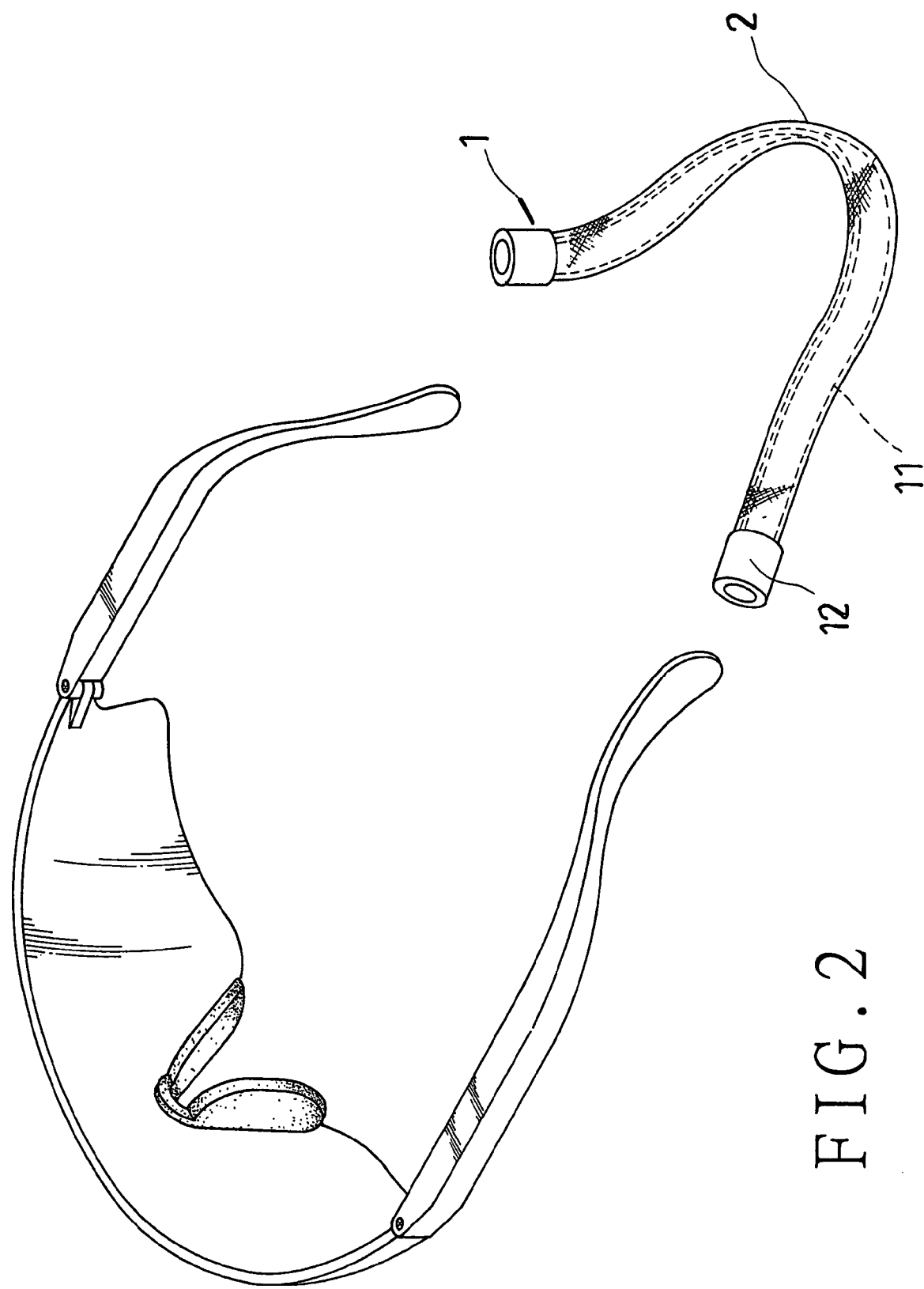
FIG. 2 is a perspective view of the present invention.
Figure 3:
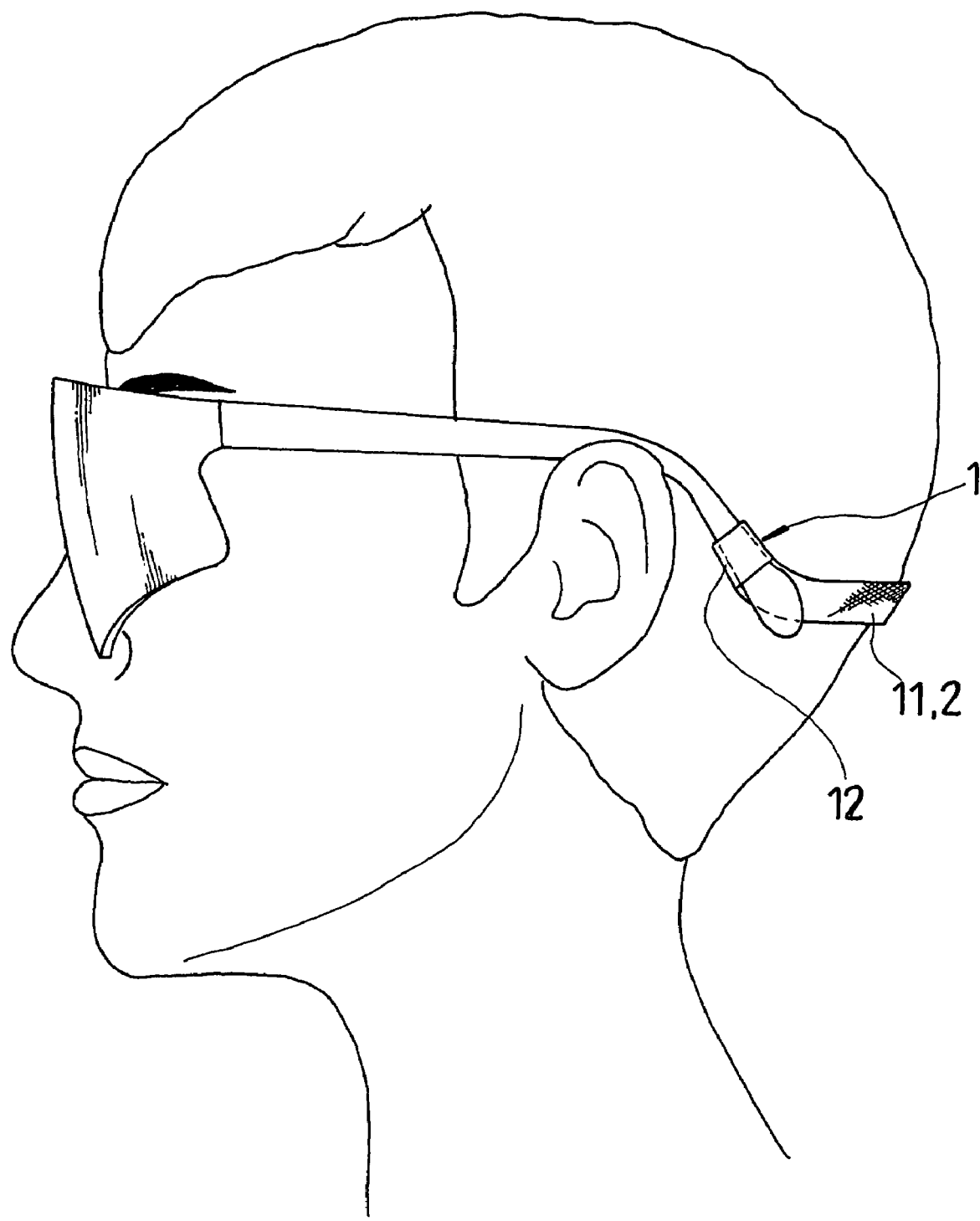
FIG. 3 is a view to illustrate the use of the present invention.

In use, referring to FIG. 2, the fastening band 1 is joined to a pair of eyeglasses with the connecting sleeve parts 12 being tight around temples of the eyeglasses respectively; referring to FIG. 3 as well, the connecting sleeve parts 12 can be changed in position on the temples according to the size of the wearer's head; thus, when the fastening band 1 and the eyeglasses together are positioned around the wearer's head, the fastening band 1 will have a proper tension to not cause discomfort.

Referring to FIG. 3, the fastening band 1 and the eyeglasses together are positioned around the wearer's head with a proper tightness such that the eyeglasses are firm, prevented from falling off accidentally. The soft and water-absorbent cotton protective member 2 covering the band main body 11 will contact the wearer's head instead of the fastening band 1, which is made of high-density airtight and watertight materials; thus, the protective member 2 will absorb the wearer's perspiration to prevent the perspiration from accumulating to cause discomfort to the wearer.

Furthermore, the soft and water-absorbent cotton protective member 2 can reduce the wearer's discomfort caused by the fastening band 1; the wearer can adjust the position of the fastening band 1 so as to make the eyeglasses firm on his/her face in order to prevent the eyeglasses from shaking/changing position/falling off accidentally when he/she is moving drastically, e.g. playing ball games, doing exercise, and participating in athletic contests.

The protective member 2 can be easily separated from the fastening band 1 to be washed and replaced with a new one to be hygienic after it takes in much perspiration or becomes dirty.

Furthermore, the protective member 2 comes in different colors and with a wide variety of patterns thereon to attract different consumers who have different likings.

From the above description, it can be seen that the present invention has the following advantages:

1. The soft and water-absorbent cotton protective member covers the band main body of the fastening band, which is made of high-density airtight and watertight materials. Therefore, the band main body of the fastening band won't contact the wearer's head, and the protective member will absorb the wearer's perspiration to prevent the perspiration from accumulating to cause discomfort to the wearer.

2. The soft and water-absorbent cotton protective member can reduce the wearer's discomfort caused by the fastening band, which will be relatively tense, and press the wearer's head in use. The fastening band can make the eyeglasses firm on the wearer's face, and in turn the eyeglasses is prevented from shaking/changing position/falling off accidentally when the wearer is moving drastically, e.g. doing exercise.

3. The connecting sleeve parts of the fastening band can be changed in position on the eyeglasses temples according to the size of the wearer's head; thus, when the fastening band and the eyeglasses together are positioned around the wearer's head, the fastening band will have a proper tension to not cause discomfort.

4. The protective member can be easily separated from the fastening band to be washed and replaced with a new one therefore the present invention is hygienic to use.

5. The protective member comes in different colors and with a wide variety of patterns thereon to attract different consumers having different likings.

What is claimed is:

1. An elastic band for use with eyeglasses, comprising
a fastening band, the fastening band being elastic; the fastening band including a band main body, and two connecting sleeve parts joined to two ends of the band main body respectively; and
a protective member removably coupled to said fastening band and covering the fastening band, the protective member being soft and water-absorbent; whereby said protective member is removable from the fastening band for cleaning and replacement of the protective member.

2. The elastic band for use with eyeglasses as claimed in claim 1, wherein the protective member covers the band main body of the fastening band.

3. The elastic band for use with eyeglasses as claimed in claim 1, wherein the protective member is made of cotton cloth.

\* \* \* \* \*